US011572853B2

(12) United States Patent
Larson (10) Patent No.: US 11,572,853 B2
(45) Date of Patent: Feb. 7, 2023

(54) MULTIPLE INTAKE AIR FILTRATION DEVICE

(71) Applicant: Kros-Wise, Inc., San Marcos, CA (US)

(72) Inventor: Kenneth J. Larson, San Marcos, CA (US)

(73) Assignee: Kros-Wise, Inc., San Marcos, CA (US)

( * ) Notice: Subject to any disclaimer, the term of this patent is extended or adjusted under 35 U.S.C. 154(b) by 226 days.

(21) Appl. No.: 17/075,490

(22) Filed: Oct. 20, 2020

(65) Prior Publication Data

US 2022/0120244 A1    Apr. 21, 2022

(51) Int. Cl.
  *F02M 35/022*    (2006.01)
  *F02M 35/02*    (2006.01)
  *F02M 35/08*    (2006.01)
  *F02M 35/04*    (2006.01)

(52) U.S. Cl.
  CPC .... *F02M 35/0223* (2013.01); *F02M 35/0205* (2013.01); *F02M 35/0212* (2013.01); *F02M 35/048* (2013.01); *F02M 35/084* (2013.01); *F02M 35/0201* (2013.01); *Y02A 50/2351* (2018.01)

(58) Field of Classification Search
  CPC ........... F02M 35/0223; F02M 35/0205; F02M 35/0212; F02M 35/048; F02M 35/084; F02M 35/0201; Y02A 50/2351; B01D 45/14; B01D 45/08
  See application file for complete search history.

(56) References Cited

U.S. PATENT DOCUMENTS

| 2,582,423 | A | * | 1/1952 | Foley | B04C 5/14 |
| | | | | | 55/449 |
| 2,667,944 | A | * | 2/1954 | Crites | B04C 5/06 |
| | | | | | 55/346 |
| 3,590,558 | A | * | 7/1971 | Fernandes | B04C 5/103 |
| | | | | | 55/460 |
| 3,951,620 | A | * | 4/1976 | Frischmuth, Jr. | B01D 45/12 |
| | | | | | 95/271 |
| 4,153,558 | A | * | 5/1979 | Frykhult | B04C 5/103 |
| | | | | | 209/733 |
| 5,129,931 | A | * | 7/1992 | Oranje | B04C 5/06 |
| | | | | | 55/399 |
| 6,679,930 | B1 | * | 1/2004 | An | B04C 7/00 |
| | | | | | 55/459.1 |

(Continued)

*Primary Examiner* — Dung H Bui
(74) *Attorney, Agent, or Firm* — Fabiano Law Firm, P.C.; Michael Fabiano (57) ABSTRACT

The Multiple Intake Air Filtration Device of this invention is a superior, highly efficient air cleaner that utilizes an array of multiple-intake cyclonic tubes spinning air at high speed to efficiently remove the specific sizes of dirt and other particulates that can be ingested in off-road and highway vehicle operations. This Multiple Intake Air Filtration Device is well-suited for use with both normally-aspirated engines and turbocharged engines. It is superior to automotive air cleaners that filter out dirt by use of a screen or porous media because it never becomes clogged as dirt and particulates are filtered out, and it is superior to devices that utilize only a single air flow through cyclonic tubes, because the device of this invention cleans intake air more efficiently while providing a strong flow of clean air to the engine or other component.

8 Claims, 11 Drawing Sheets

(56) References Cited

U.S. PATENT DOCUMENTS

| | | | |
|---|---|---|---|
| 6,793,814 B2* | 9/2004 | Fout | B01D 21/2477 |
| | | | 210/512.3 |
| 6,837,912 B1* | 1/2005 | Heumann | B04C 5/103 |
| | | | 55/424 |
| 6,887,290 B2 | 5/2005 | Strauser | |
| 7,410,535 B2* | 8/2008 | Song | A47L 9/1658 |
| | | | 55/459.1 |
| 7,416,575 B2* | 8/2008 | Oh | F15D 1/02 |
| | | | 55/459.1 |
| 7,722,693 B2* | 5/2010 | Yoo | A47L 9/165 |
| | | | 55/455 |
| 7,799,106 B2 | 9/2010 | Rother | |
| 7,931,719 B2* | 4/2011 | Sams | B01D 45/12 |
| | | | 55/456 |
| 9,095,806 B2 | 8/2015 | Menssen | |
| 10,052,579 B2* | 8/2018 | Hallgren | B04C 9/00 |
| 10,791,898 B2* | 10/2020 | Hyun | A47L 9/1658 |
| 2007/0209336 A1 | 9/2007 | Conrad | |
| 2008/0016832 A1 | 1/2008 | Krisko | |
| 2008/0209869 A1 | 9/2008 | Rother | |
| 2009/0193771 A1* | 8/2009 | Oh | A47L 9/1641 |
| | | | 55/346 |
| 2009/0308250 A1 | 12/2009 | Rotter | |
| 2012/0233972 A1 | 9/2012 | Menssen | |
| 2013/0133300 A1 | 5/2013 | Ackermann et al. | |
| 2016/0146165 A1* | 5/2016 | Gehlhoff | F02M 35/0216 |
| | | | 55/385.3 |
| 2019/0277227 A1 | 9/2019 | Larson | |

\* cited by examiner

MULTIPLE INTAKE AIR FILTRATION DEVICE

FIELD OF THE INVENTION

The field of the present invention is air filtration devices, and specifically as set forth herein, air filtration devices for vehicles with internal combustion engines.

BACKGROUND

Engine air quality is important in connection with automobiles, trucks, and other vehicles with internal combustion engines. Air filtration devices, or air filters, are used to improve the quality of engine air intake by removing particulates from the intake air. One intended goal of filtering intake air is to prevent particles such as dirt, sand, and debris from entering the engine and possibly causing wear to engine parts, or the contamination of engine oil. Often, air filters employed in these applications use materials like paper, foam, cotton, or spun fiberglass to remove particulates from intake air. One downside to such filters is that they need to be replaced frequently because the fibrous material becomes clogged with the filtered-out particulates.

Other air filters, including those in U.S. Pat. Nos. 7,799,106 and 9,095,806, employ a single cyclonic air flow through the device, with the goal of removing particulates from intake air before that air reaches the engine. Those single-flow filters do not contain the fibrous material that requires frequent replacement, but they often provide less intake air flow to the engine than is desired for optimal engine efficiency. Accordingly, there remains a need for a more efficient and effective cyclonic air filtration device for vehicles.

As set forth herein, the present invention, with its array of multiple intake cyclonic tubes, offers substantial benefits not found in either of the aforedescribed filter types.

SUMMARY OF THE INVENTION

The present invention is a novel, multiple intake cyclonic air filtration device that is superior to both conventional filters that use fibrous materials and single-flow cyclonic air filters.

Figure 2A:
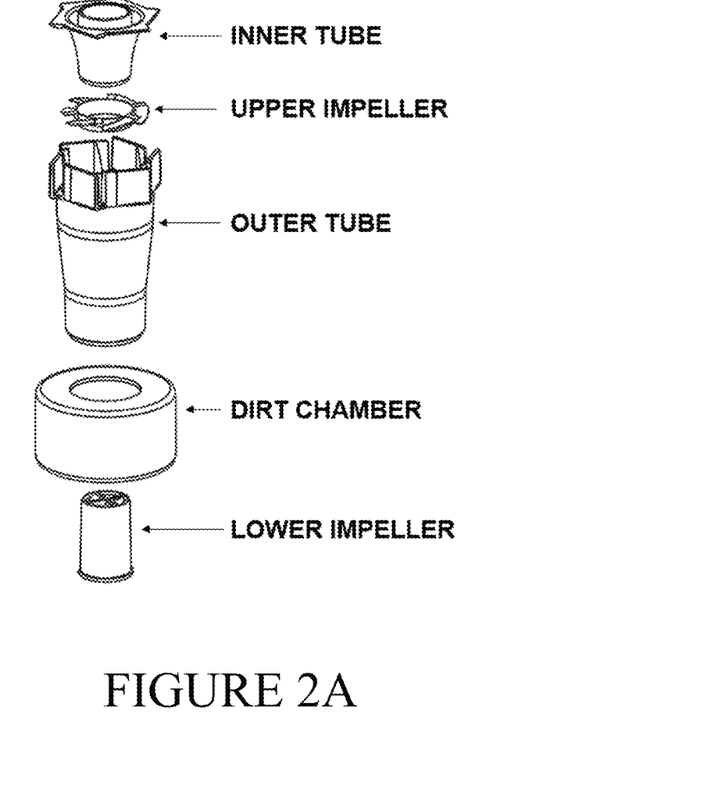
FIG. 2A shows an expanded view of one of the multiple intake cyclonic filter tubes of the same exemplary air filtration device, illustrating each component part of the cyclonic filter tube.
Figure 2B:
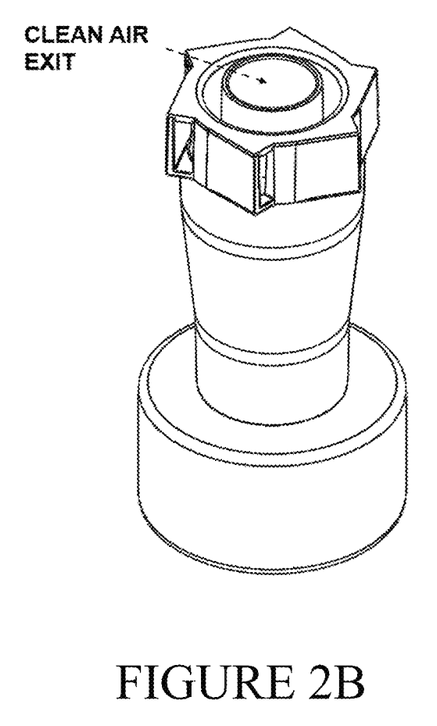
FIG. 2B shows an assembled outer view of one of the multiple intake cyclonic filter tubes.
Figure 4:
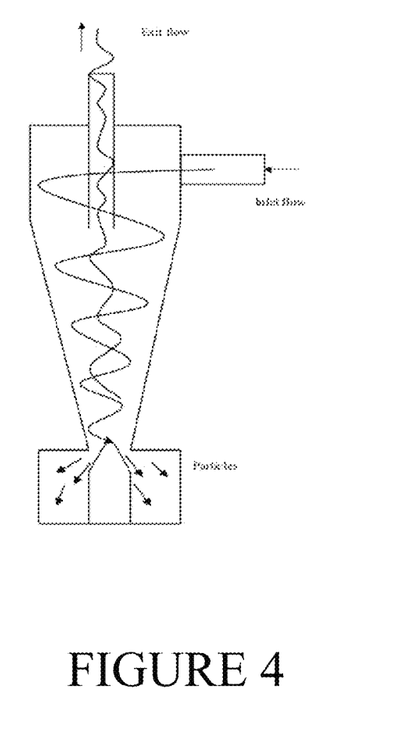
FIG. 4 shows an example of a single-flow cyclonic tube of previous cyclonic tube devices, to contrast with the present invention.

The present invention differs substantially from other cyclonic filtration devices, in that the present invention employs multiple cyclonic tubes and two distinct intake air flows, i.e., intake air entering from opposing sides of each cyclonic tube (upper and lower), as shown in one of the cyclonic tubes of a preferred embodiment, in FIG. 2A. Shown in FIG. 2A is a view of one of the cyclonic tubes of the device of the present invention, showing 6 tangential intakes while the underside of each tube has one intake port, under the lower impeller. The 6 tangential intakes at the top of each tube and the underside intake at the bottom ingest dirty air from different directions. Clean air exits from the top of the tube assembly as shown in FIG. 2B. Other cyclonic tube devices used in vehicle air filtration, in contrast, are single-flow devices that utilize intake from only a single direction, as shown for example in FIG. 4.

The design of this invention, specific to motorized vehicles, enables filtration of intake air and removal of particulates as small as or smaller than 10 microns, across a wide range of volumetric flow conditions from idle to full throttle. Many other cyclonic devices, typically those not suited for motor vehicle applications, filter at one single constant speed provided by an electric fan or similar constant speed device, and do not filter particles as efficiently as devices of the present invention.

The design of the Upper Impeller and Lower Impeller in the present invention enables the two flows of intake air, coming into the device from different directions and entering each cyclonic tube at opposite ends, to converge in-phase over the length of the cyclonic tube. The length of the cyclonic tube represents low RPM convergence of the two flows at the top of the tube while at high motor speed the convergence of the two flows occurs at the bottom of the cyclonic tube. This convergence of the two flows is important since it maintains higher cyclonic velocities than single flow cyclonic tubes. In addition, the two flows and their convergence in-phase, allows multiple particles to form a single larger more massive particle which is more apt to filter under cyclonic flow. Considerable effort was made to ensure that intake air over this wide range of flow, low to high engine speed, could efficiently filler out dust particles as small as or smaller than 10 microns, as well as larger sand particles encountered by motorized vehicles.

Additionally, the increased filtration efficiency of the present invention, particularly at high intake air flow rates, permits devices of the present invention to have an overall size that is more compact as compared to typical motor vehicle air filtration devices.

Motorized vehicles with paper filters produce a negative pressure that limits the power loss to negligible levels at peak power. The multi-flow cyclonic filtration system design of the present invention utilizes this negative pressure as a target to determine the number of cyclonic tubes required at peak power and to maintain negligible power loss. This unique design then utilizes the length of the cyclonic tube to achieve flow convergence from the Upper Impeller and Lower Impeller from idle to peak power. The designs of the Upper Impeller and Lower impeller permit both flows to remain phase matched over the length of the tube. This results in a motorized cyclonic filtration system that is easily scaled to fit different displacement engines. Larger engines will require a larger cyclonic filtration system, but will never clog or degrade.

The multiple intake air filtration device of the present invention is a highly efficient air cleaner that is well-suited for use with both normally-aspirated engines and turbo-charged engines. The device of the present invention is superior to current automotive air cleaners that filter out dirt by use of a screen or a porous medium, because the device of the present invention does not become clogged as dirt and particulates are filtered from raw intake air; rather, the filtered-out dirt and particulates are collected in chambers that can be easily emptied.

Further, the dirt separation tubes of this invention enable proper engine intake flow that is superior to that provided by single-flow cyclonic filtration devices, and, among other applications, the device of this invention efficiently removes the specific sizes of dirt particles that can be ingested in off-road and highway vehicle operations.

DETAILED DESCRIPTION OF PREFERRED EMBODIMENTS

The air filtration device of this invention uses an array of multiple intake cyclonic tube assemblies to separate out dirt, sand, and other foreign particles and thus to allow clean air to flow into an engine or other component that requires clean air.

Figure 1A:
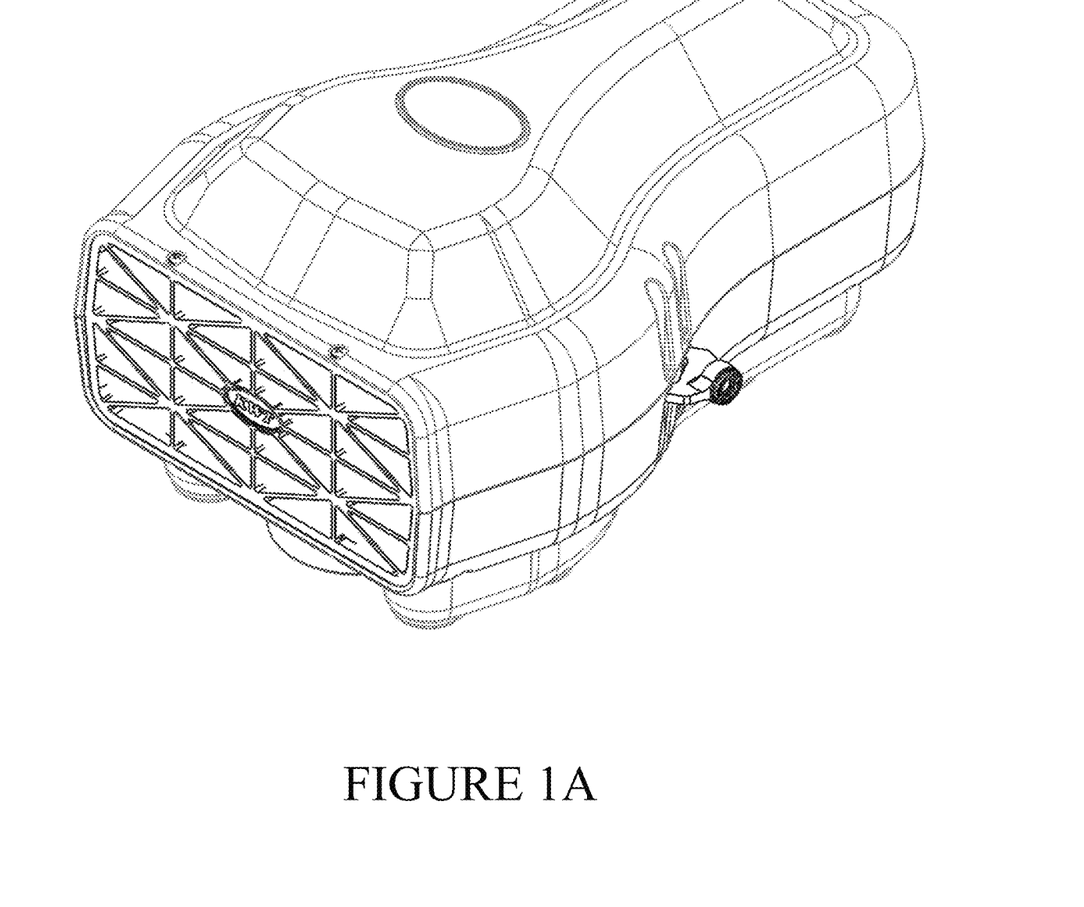
FIG. 1A shows a top and side view of an exemplary air filtration device as described in preferred embodiments herein.
Figure 1B:
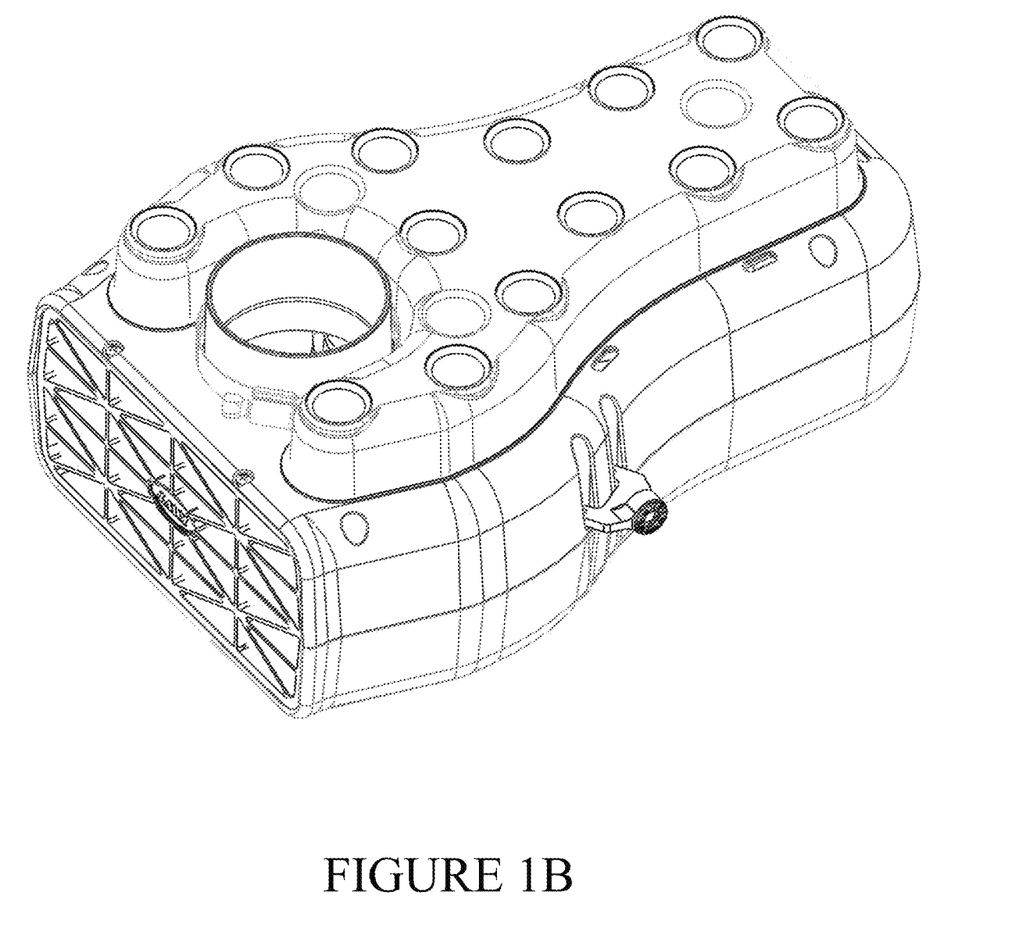
FIG. 1B shows a bottom view of the same exemplary air filtration device.

In a preferred embodiment, multiple cyclonic tubes are placed inside a case or housing as shown in FIGS. 1A and 1B. In this embodiment, when the air filtration device is attached to a vehicle and said vehicle is in operation, intake air flows into this air filtration device both through the front face of the device seen in FIG. 1A and through the multiple ports (one corresponding to each cyclonic tube assembly) in the bottom of the case or housing, as can be seen in FIG. 1B. It will be understood by one skilled in the art that this invention can be practiced with an air filtration device containing a plurality of air flow ports and corresponding cyclonic tubes that may be as few as 3 and as many as 15 or more. Also in this preferred embodiment, the cyclonic tubes used in the device are approximately 5 inches tall and 2 inches in diameter, and are comprised of multiple cyclonic tubes arranged together to form the filtration system. Persons skilled in the art will recognize that cyclonic tubes of different heights and diameters may be appropriate for certain applications depending on the vehicle involved and/or the flow rate of intake air during vehicle operation.

Figure 2C:
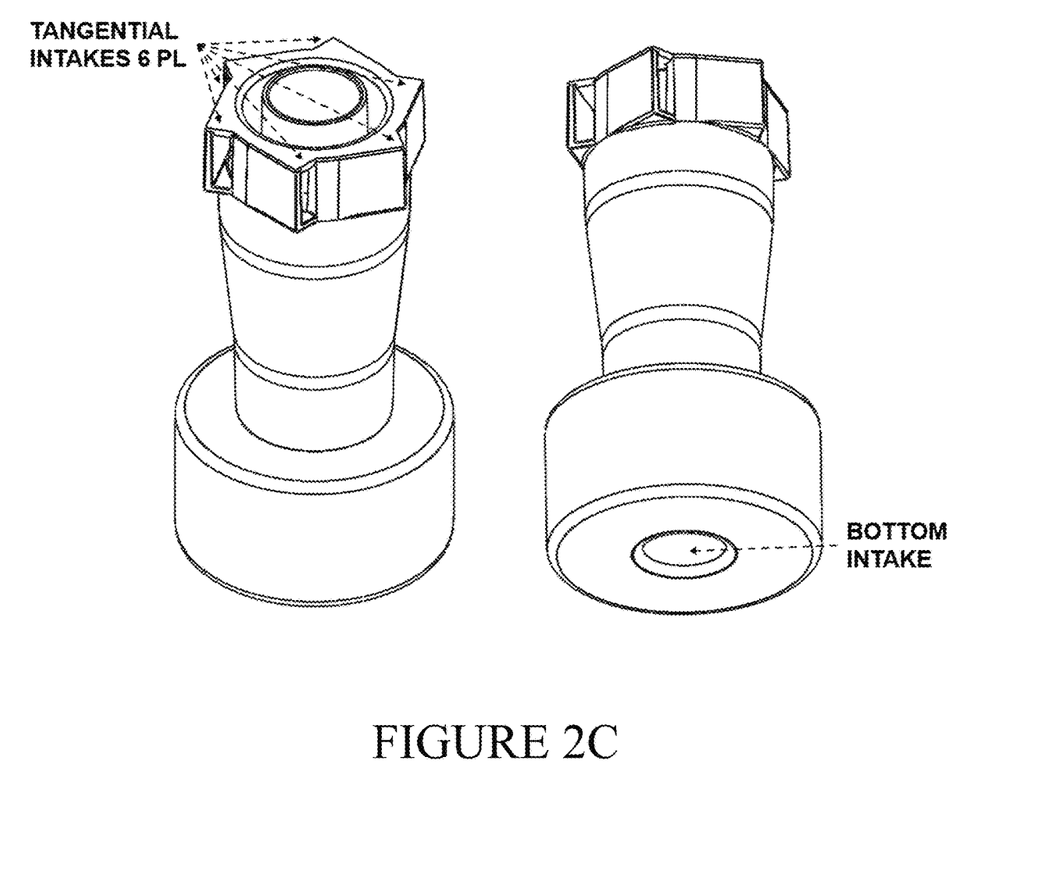
FIG. 2C shows the multiple air intakes in one of the multiple intake cyclonic filter tubes, indicating the air intake ports at the top and at the bottom of each tube.
Figure 3:
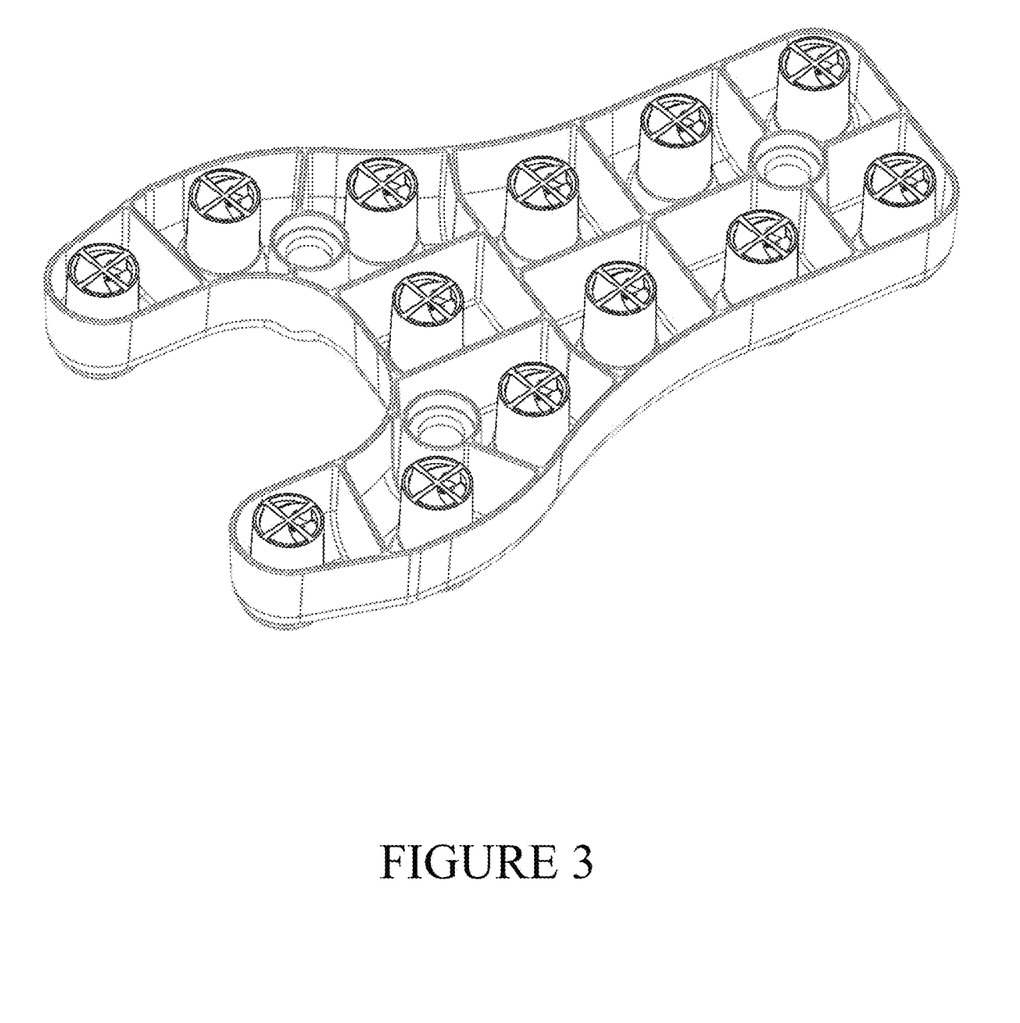
FIG. 3 shows an internal view of the bottom portion of an exemplary air filtration device as described in preferred embodiments herein.
Figure 5:
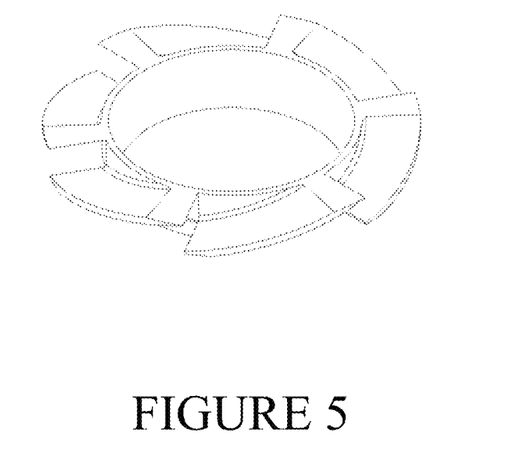
FIG. 5 shows a view of an upper impeller used in an exemplary air filtration device as described in preferred embodiments herein.
Figure 6:
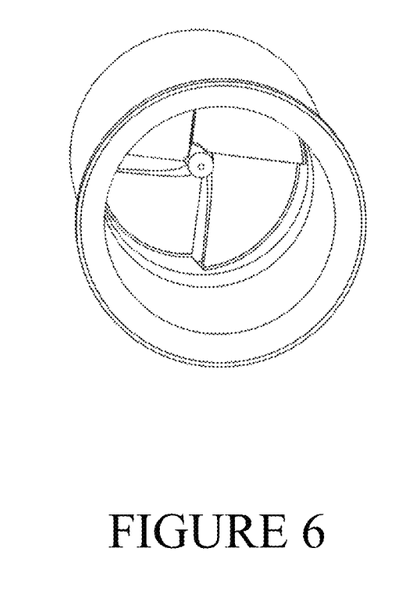
FIG. 6 shows a view of a lower impeller that, in preferred embodiments described herein, fits on top of one of the holes in the bottom of an exemplary air filtration device as described in preferred embodiments herein, such as in FIG. 3.
Figure 7:
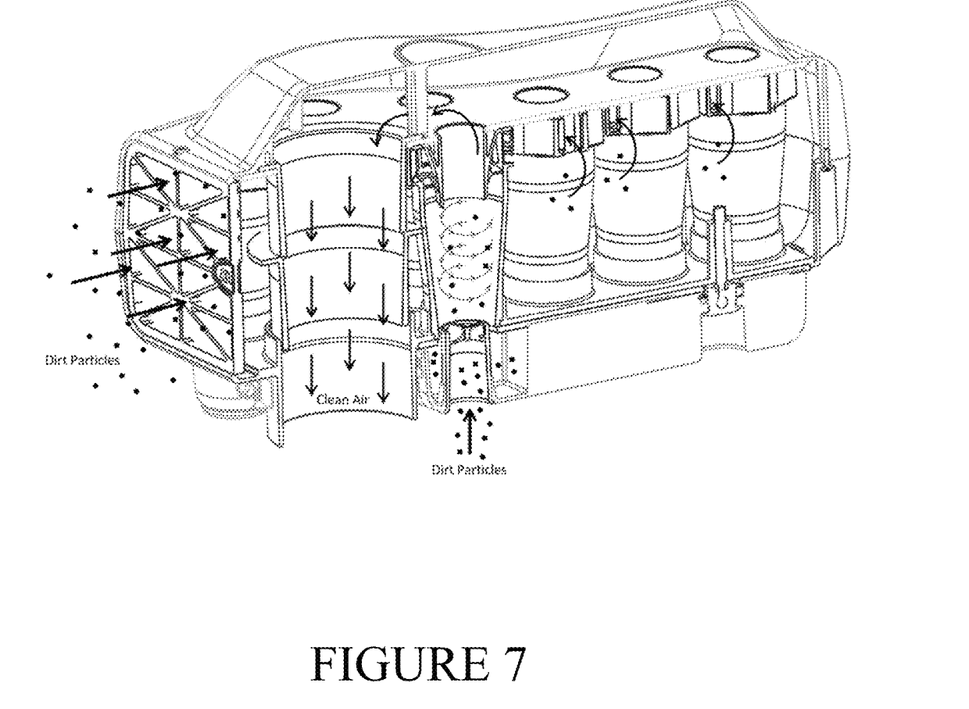
FIG. 7 shows a cutaway view, top side up, of air flow into and out of an exemplary air filtration device as described in preferred embodiments herein, illustrating "dirty" intake air flowing in through side and bottom intake ports, and clean air flowing out of the device to the engine or other component.
Figure 8:
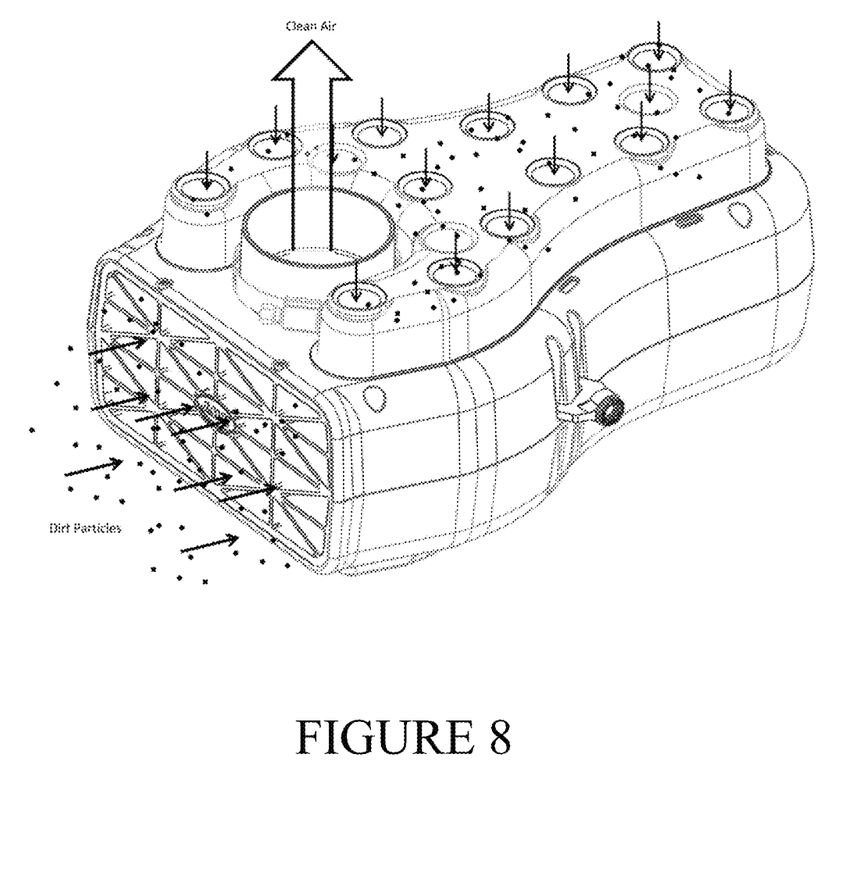
FIG. 8 shows a bottom side up view of air flow into and out of an exemplary air filtration device as described in preferred embodiments herein, illustrating "dirty" intake air flowing in through side and bottom intake ports, and clean air flowing out of the device to the engine or other component.

In this same preferred embodiment, each cyclonic tube has six tangential air intake ports at the top, as seen in FIGS. 2A, 2B, and 2C. The entire cyclonic tube assembly of one of the multiple cyclonic tubes of this preferred embodiment is shown in FIG. 2A. Beginning at the bottom of FIG. 2A, the figure shows a bladed lower impeller (shown separately in FIG. 6), that fits on top of one of the intake openings and dirt collection chambers (as seen in FIG. 1B from the outside of the device, and FIG. 3 as seen from the inside) that are located at the bottom of the complete device. On top of the lower impeller is the bottom of the outer tube seen in FIG. 3; this outer tube has, at its top, multiple tangential openings into which intake air flows, as seen in FIG. 2C. Atop the outer tube sits an upper impeller (shown separately in FIG. 5), with a number of blades corresponding to the number of the outer tube's tangential openings, and on top of the upper impeller is an inner tube, or cap, that has a top opening through which clean air flows out, shown in FIG. 2B, as a result of the cyclonic filtration that takes place inside the tube. The multiple intake cyclonic action has flows of intake air into the top tangential intake openings and into the bottom intake opening, as shown in FIG. 2C. The resulting combination of the two intake cyclonic air flows pushes cleaner air out of the air filtration device, as shown in FIGS. 7 and 8, and pushes particulates down out of each cyclonic tube into its respective "egg crate"-style chamber illustrated in FIG. 3. The bottom part of the air filtration device, illustrated in FIG. 3, is easily removed, or alternatively contains detachable plugs, so that the particulates collected in the "egg crate" chambers can be removed and the device then put back together for future use.

The multiple intake air filtration device of this invention has multiple applications. In one preferred embodiment, the air filtration device is a replacement of the OEM filter and attaches directly to an engine's air intake port, outside air flows into the assembly and is filtered through the multiple cyclonic tubes that spin the intake air at high velocity. The filtered-out particles are collected in a chamber of the device and clean, filtered air is sent through into the engine.

In another preferred embodiment, the air filtration device can be utilized as a "pre-filter" to take in air, filter out dirt and other foreign particles, and send the air into the vehicle's existing filter system, through which the air eventually passes into the vehicle's engine.

In an alternate preferred embodiment, the air filtration device can be connected to a vehicle's clutch, to remove dirt and other particulates that can clog the clutch in some vehicles.

Terms such as "top," "side," and "bottom" as used herein are intended for purposes of describing embodiments of the air filter and to provide a frame of reference in the context of this description and the drawings herein. The actual orientation of the air filtration device when in use, and thus the ultimate directions of air flows, may vary depending on the application and on the vehicle or component to which the air filtration device is attached.

Other changes and modifications and additional embodiments of the present invention will become apparent to those skilled in the art, and should be understood as being included within the scope of the present invention.

What is claimed is:

1. An air filtration device that can be used as the primary filter of intake air to a motor vehicle's engine, comprising:
    a housing, including
        (a) a first opening on one end of the housing, through which intake air flows into the device,
        (b) a second opening through which clean air flows out of the device,
        (c) three or more additional intake openings on the housing, through which intake air flows into the device, (d) a cyclonic filter fitted onto each of the said three or more additional intake openings and inside the housing,
 wherein each said cyclonic filter comprises: a lower impeller tube, with one or more blades inside said tube, that fits directly on top of said additional intake opening; an outer tube that fits on top of said lower impeller tube, said outer tube having multiple tangential openings at the top of said outer tube; an upper impeller with blades corresponding to the multiple tangential openings on the outer tube; and a cap ("inner tube") that has a top opening.

2. The air filtration device of claim 1, wherein each additional intake opening opens into a separate chamber inside the housing.

3. The air filtration device of claim 1, wherein the portion of the housing containing the additional intake openings is capable of being detached to enable collected dirt and other particulates to be discarded.

4. The air filtration device of claim 1, wherein the said second opening has a rim configured to mate to a connection to a vehicle engine.

5. The air filtration device of claim 1, wherein the said second opening has a rim configured to mate to a connection to a vehicle's clutch.

6. An air filtration device that can be used as a pre-filter of intake air prior to air flow into a motor vehicle's engine-air filtration system, comprising:
a housing, including
  (a) a first opening on one end of the housing, through which intake air flows into the device,
  (b) a second opening through which clean air flows out of the device,
  (c) three or more additional intake openings on the housing, through which intake air flows into the device,
  (d) a cyclonic filter fitted onto each of the said three or more additional intake openings and inside the housing,
  wherein each said cyclonic filter comprises: a lower impeller tube, with one or more blades inside said tube, that fits directly on top of said additional intake opening; an outer tube that fits on top of said lower impeller tube, said outer tube having multiple tangential openings at the top of said outer tube; an upper impeller with blades corresponding to the multiple tangential openings on the outer tube; and a cap ("inner tube") that has a top opening.

7. The air filtration device of claim 6, wherein each additional intake opening opens into a separate chamber inside the housing.

8. The air filtration device of claim 6, wherein the portion of the housing containing the additional intake openings is capable of being detached to enable collected dirt and other particulates to be discarded.

\* \* \* \* \*